United States Patent
Santra

(10) Patent No.: US 12,400,069 B2
(45) Date of Patent: Aug. 26, 2025

(54) ARTIFICIAL INTELLIGENCE BASED APPROACH FOR AUTOMATICALLY GENERATING CONTENT FOR A DOCUMENT FOR AN INDIVIDUAL

(71) Applicant: INTUIT INC., Mountain View, CA (US)

(72) Inventor: Subrata Santra, Bangalore (IN)

(73) Assignee: INTUIT INC., Mountain View, CA (US)

( * ) Notice: Subject to any disclaimer, the term of this patent is extended or adjusted under 35 U.S.C. 154(b) by 183 days.

(21) Appl. No.: 18/475,388

(22) Filed: Sep. 27, 2023

(65) Prior Publication Data

US 2025/0103795 A1    Mar. 27, 2025

(51) Int. Cl.
    *G06F 17/00*     (2019.01)
    *G06F 40/166*     (2020.01)
    *G06F 40/40*     (2020.01)
    *G06N 3/09*     (2023.01)

(52) U.S. Cl.
    CPC ............ *G06F 40/166* (2020.01); *G06F 40/40* (2020.01); *G06N 3/09* (2023.01)

(58) Field of Classification Search
    CPC ........ G06F 40/166; G06F 40/40; G06F 40/30; G06N 20/00; G06N 3/09
    See application file for complete search history.

(56) References Cited

U.S. PATENT DOCUMENTS

| | | | |
|---|---|---|---|
| 9,373,261 B2* | 6/2016 | Horstemeyer | H04L 63/08 |
| 10,628,632 B2* | 4/2020 | Di Paolo | G06F 40/169 |
| 11,868,721 B2* | 1/2024 | Durvasula | G06F 40/279 |
| 11,887,359 B2* | 1/2024 | Zhou | G06V 40/28 |
| 11,989,237 B2* | 5/2024 | Wang | G06F 16/90332 |
| 12,182,525 B2* | 12/2024 | Beshara | G06F 40/56 |
| 12,287,833 B1* | 4/2025 | Chia | G06F 16/906 |
| 2019/0173825 A1* | 6/2019 | Ramalingam | H04L 51/10 |
| 2019/0379753 A1* | 12/2019 | Brunn | H04L 67/55 |
| 2021/0209121 A1* | 7/2021 | Liu | G06F 16/338 |

(Continued)

FOREIGN PATENT DOCUMENTS

| | | | | | |
|---|---|---|---|---|---|
| WO | WO-2019027259 A1 | * | 2/2019 | ......... | G06F 16/3326 |
| WO | WO-2021255057 A1 | * | 12/2021 | ........... | G06F 40/289 |
| WO | WO-2022250909 A1 | * | 12/2022 | ........... | G06F 40/166 |

*Primary Examiner* — Laurie A Ries
(74) *Attorney, Agent, or Firm* — Patterson + Sheridan, LLP

(57) ABSTRACT

A method for automatically generating content for a document for an individual includes providing input data to a trained artificial intelligence model. The input data includes a plurality of input features specific to the individual, and the trained artificial intelligence model is trained through a supervised learning process using training data that includes a plurality of input features for each of a plurality of individual other than the individual for whom the document is being created. The method includes receiving output data from the artificial intelligence model that is based, at least in part, on the input data and includes the content the artificial intelligence model automatically generated for the document for the individual. The method includes receiving user feedback on the content automatically generated by the artificial intelligence model and generating updated training data for the artificial intelligence model based, at least in part, on the user feedback.

17 Claims, 4 Drawing Sheets

(56) References Cited

U.S. PATENT DOCUMENTS

| | | | |
|---|---|---|---|
| 2021/0224491 A1* | 7/2021 | Kim | G06F 40/44 |
| 2022/0035988 A1* | 2/2022 | Mason | G06F 40/106 |
| 2022/0417192 A1* | 12/2022 | Dotan-Cohen | G06F 40/30 |
| 2023/0133392 A1* | 5/2023 | Wang | G06F 40/211 |
| | | | 704/9 |
| 2024/0126924 A1* | 4/2024 | Pabolu | G06F 40/166 |
| 2024/0330580 A1* | 10/2024 | Hariri | G06F 40/30 |
| 2024/0354641 A1* | 10/2024 | Miller | G06N 3/045 |
| 2024/0386879 A1* | 11/2024 | Ohayon | G10L 13/086 |
| 2025/0103919 A1* | 3/2025 | Bajaj | G06N 20/00 |

\* cited by examiner

ARTIFICIAL INTELLIGENCE BASED APPROACH FOR AUTOMATICALLY GENERATING CONTENT FOR A DOCUMENT FOR AN INDIVIDUAL

INTRODUCTION

Aspects of the present disclosure are directed to techniques for automatically generating content for a document (e.g., tax organizer) for an individual based on a plurality of different features for the individual. More particularly, the present disclosure is directed to artificial intelligence based techniques for automatically generating the content for the document.

BACKGROUND

Before a professional (e.g., accountant) can provide a service (e.g., tax return preparation) to a client, the professional must collect relevant information from the client that will allow the professional to provide the service. To accomplish this, the professional may create a questionnaire (e.g., tax organizer) for the client to complete that include a series of questions formulated to collect details (e.g., marital status, home ownership, etc.) about the client that will help the professional provide the requested service (e.g, tax return preparation) for the client. The questionnaire is manually created by the professional. In particular, the professional may search for questionnaires previously created for similar clients. The accountant may then manually create the questionnaire for the client using content from the prior questionnaires. Such a process is both time-intensive and error prone, especially if the professional has a large client base and therefore needs to manually create several different questionnaires.

Accordingly, there is a need for techniques for improving the process of creating documents that are uniquely tailored for an individual.

BRIEF SUMMARY

In one aspect, a method for automatically generating content for a document for an individual includes providing input data to a trained artificial intelligence model. The input data includes a plurality of input features specific to the individual, and the trained artificial intelligence model is trained through a supervised learning process using training data that includes a plurality of input features for each of a plurality of individuals other than the individual for whom the document is being created. The method includes receiving output data from the artificial intelligence model that is based, at least in part, on the input data and includes the content the artificial intelligence model automatically generated for the document for the individual. The method includes receiving user feedback on the content automatically generated by the artificial intelligence model and generating updated training data for the artificial intelligence model based, at least in part, on the user feedback.

In another aspect, a non-transitory computer-readable storage medium is provided that stores instructions that, when executed by a computer system, cause the computer system to perform the method set forth above. In yet another aspect, a system is provided that includes at least one memory and at least one processor configured to perform the method set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
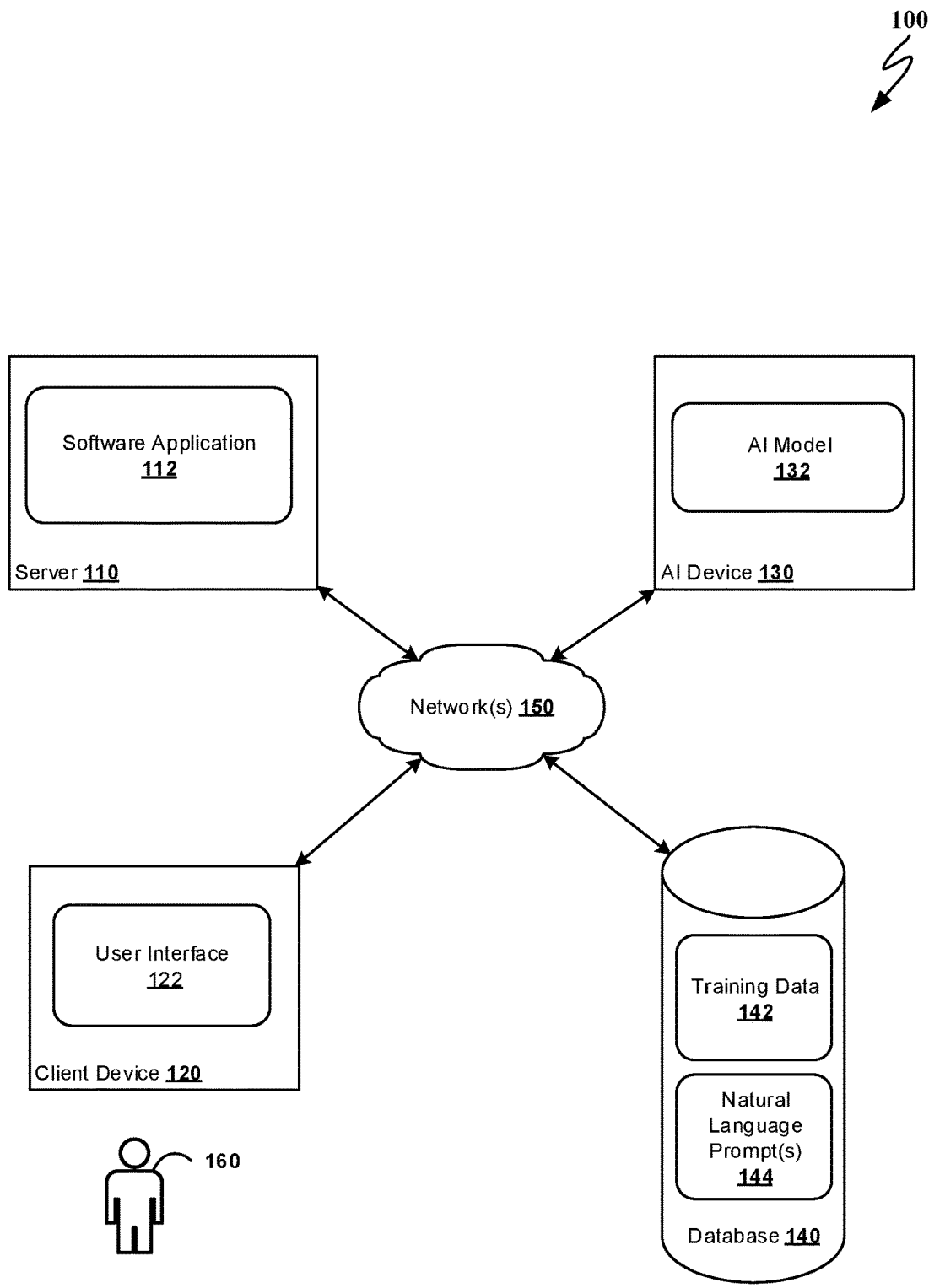
FIG. 1 depicts a computing environment for automatically generating content for a document for an individual according to some embodiments of the present disclosure.

Example aspects of the present disclosure are directed to creating documents that are uniquely tailored for an individual. Such documents may be associated with a professional service. For example, such a document may include a questionnaire (e.g., tax organizer) associated with a tax return preparation service provided by an accountant. The questionnaire may be manually created by the accountant to collect details about the individual to help the accountant understand the individual's tax situation and, as a result, determine a strategy for preparing a tax return for the individual. To create the questionnaire, the accountant may search for prior questionnaires created for similar individuals (e.g., individuals having a similar tax situation) and may then manually create the questionnaire for the individual based on content included in the prior questionnaire(s). This process in which the questionnaire is manually created by the accountant is time-intensive and error prone, especially if the accountant has a large client base and therefore needs to manually create several different questionnaires.

Example aspects of the present disclosure are directed to artificial intelligence based techniques for automatically generating content for a document that is uniquely tailored for an individual based on a plurality of different input features. In some embodiments, the plurality of different input features may be associated with a source document (e.g., prior tax return). Examples of the plurality of different input features associated with the source document may include, without limitation, age, gender, education, income, or marital status.

In some embodiments, an artificial intelligence model (e.g., large language model) may be trained to generate content for the document that is uniquely tailored for the individual based, at least in part, on the plurality of different input features for a plurality of different individuals. More specifically, training data that includes the plurality of different input features for the plurality of different individuals may be provided as an input to the artificial intelligence model. In some embodiments, a natural language prompt instructing the artificial intelligence model on what to do with the training data may also be provided as an input to the artificial intelligence model. For example, the natural language prompt may read, "Based on the provided data for a given individual seeking a professional service, generate content for the document that is unique to the individual."

The artificial intelligence model may automatically generate content for a plurality of documents based on the training data. The content for each of the documents may be uniquely tailored for a respective individual associated with the training data. For instance, the content generated for a first document of the plurality of documents may include a first set of questions that the artificial intelligence model determined are relevant to a first individual, whereas the content generated for a second document of the plurality of documents may include a second set of questions that the artificial intelligence model determined are relevant to a second individual. It should be understood that the second set of questions may be different from the first set of questions due, at least in part, to differences in the input features for the first user and the input features for the second user.

In some embodiments, the content generated by the artificial intelligence model may be reviewed by an authorized individual. For example, the authorized individual may review the content (e.g., first set of questions) generated for the first document for the first individual to confirm whether the content (e.g., first set of questions) is, in fact, relevant to the first individual. If the authorized individual determines the first set of questions includes one or more questions that are not relevant to the first individual, feedback indicating such may be provided to the artificial intelligence model as updated training data. In this manner, the artificial intelligence model may be re-trained so that the artificial intelligence model does not generate the question(s) for subsequent individuals having input features that are similar to that of the first individual.

Example aspects of the present disclosure provide numerous technical effects and benefits. For instance, since the training data used to train the artificial intelligence model to generate content for a document that is uniquely tailored for an individual includes a plurality of different input features for a plurality of different individuals, content the artificial intelligence model automatically generates for the document based on the plurality of input features for the individual may be improved compared to content manually generated by a professional (e.g., accountant). More specifically, the artificial intelligence model may generate more content (e.g., questions) that is relevant to the individual than compared to the content generated manually by the professional. The additional content that the artificial intelligence model generates for the document may also improve a quality of service the professional provides the individual, because the additional content may allow the professional to better understand the individual's situation (e.g., tax situation) and, as a result, provide an improved quality of service for the individual.

Additionally, by improving the accuracy of the content generated by the artificial intelligence model, techniques (e.g., re-training) described herein avoid the computing resource utilization that would otherwise be associated with generating irrelevant content for the document that would require additional actions from the professional (e.g, accountant) or the individual for whom the document is uniquely tailored to identify the irrelevant content and additional processing to handle such actions.

Example Computing Environment for an Artificial Intelligence Based Approach for Automatically Generating Content for a Document FIG. 1 illustrates a computing environment 100 to facilitate automatically generating content for a document that is uniquely tailored for an individual according to some embodiments of the present disclosure. In some embodiments, the document may be a questionnaire (e.g., tax organizer) associated with a tax return preparation service offered by a professional, such as a licensed accountant. It should be appreciated, however, that the scope of the present disclosure is not intended to be limited to automatically generating a document (e.g., tax organizer) associated with a tax return preparation service.

The computing environment 100 may include a server 110, a client device 120 (e.g., mobile phone, tablet, laptop, etc.), an artificial intelligence device 130, and a database 140. The server 110, the client device 120, the artificial intelligence device 130, and the database 140 may be communicatively coupled to one another via one or more networks 150. Examples of the network(s) 150 may include, without limitation, a wide area network (WAN), a local area network (LAN), and/or a cellular network.

In some embodiments, the server 110 may include a software application 112 associated with generating the document for the individual. For instance, the software application 112 may be stored in memory (not shown) of the server 110 and executed by one or more processors (also not shown) of the server 110. In alternative embodiments, the software application 112 may be stored in memory of the client device 120 and executed by one or more processors of the client device 120. In this manner, the software application 112 may be executed locally on the client device 120. In still other embodiments, functionality of the software application 112 may be distributed amongst the server 110 and the client device 120. For instance, in such embodiments, one or more functions associated with the software application 112 may be executed on the server 110 and one or more functions associated with the software application 112 may be executed on the client device 120.

In some embodiments, the client device 120 may include a user interface 122 that allows a user 160 to input information (e.g., a plurality of input features) associated with the individual for whom the document will be uniquely tailored. For instance, the user 160 may be a professional (e.g., accountant) offering a professional service (e.g., tax return preparation) and may input a plurality of input features for an individual (e.g., taxpayer). Such input features may include, without limitation, age, gender, marital status, income, and employment for the individual. In some embodiments, the professional may upload a source document (e.g., prior tax return) associated with the individual, and the software application 112 may extract the plurality of input features from the source document.

In some embodiments, a profile may be created for the individual. For example, the software application 112 may include a module (not shown) configured to create the profile for the individual based, at least in part, on the input features for the individual as provided by the user 160 via the user interface 122. In some embodiments, the software application 112 may be further configured to map the profile created for the individual to one of a plurality of profiles previously created by the software application 112 for a plurality of different individuals. Each of the plurality of profiles previously created by the software application 112 may be representative of one or more individuals (e.g., taxpayers) having similar features. To map the profile created for the individual to one of the previously created profiles, the software application 112 may, in some embodiments, be configured to compare the features of the individual that are included in the recently created profile to corresponding features in one or more of the previously created profiles to match the recently created profile for the individual to one of the previously created profiles. As will be discussed in more detail, the plurality of input features from the different profiles created by the software application 112 may be provided as an input to the artificial intelligence device 130 to train the artificial intelligence device 130 to automatically generate content for the document that is uniquely tailored for a given individual.

The artificial intelligence device 130 may include an artificial intelligence model 132. In some embodiments, the artificial intelligence model 132 may include a machine learning model. For instance, in some embodiments, the machine learning model may include a large language model (LLM). It should be understood, however, that the artificial intelligence model 132 may include any suitable type of machine learning model.

In some embodiments, the artificial intelligence model 132 can be a neural network. Neural networks generally include a collection of connected units or nodes called artificial neurons. The operation of neural networks can be modeled as an iterative process. Each node has a particular value associated with it. In each iteration, each node updates its value based upon the values of the other nodes, the update operation typically consisting of a matrix-vector multiplication. In some cases, a neural network can include one or more aggregation layers, such as a softmax layer.

In some embodiments, training of the artificial intelligence model 132 involves a supervised learning process that involves providing training data 142 (e.g., prior tax returns for a plurality of different individuals) to the artificial intelligence model 132. As part of the supervised learning process, one or more natural language prompts 144 may also be provided to the artificial intelligence model 132. For instance, in some embodiments, the one or more natural language prompts 144 may provide the artificial intelligence model 132 with context on what the artificial intelligence model 132 should do with the training data 142. As an example, the one or more natural language prompts 144 may prompt the artificial intelligence model to process the training data to generate content (e.g., questions) for a document according to one or more input features (e.g., extracted from prior tax return) specific to a given individual associated with the training data 142. In this manner, the artificial intelligence model 132 may be trained to generate content for a document that is relevant to a given individual for whom the document is intended to be uniquely tailored.

The artificial intelligence model 132 may process the training data 142 and determine outputs (e.g., content for a document to uniquely tailor a document for a given individual) based on the training data 142. The outputs are compared to known labels associated with the training data 142 (e.g., labels manually applied to training data by experts or otherwise known to be associated with the training inputs, such as based on historical associations) to determine the accuracy of the artificial intelligence model 132, and parameters of the model are iteratively adjusted until one or more conditions are met. For instance, the one or more conditions may relate to an objective function (e.g., a cost function or loss function) for optimizing one or more variables (e.g., model accuracy). In some embodiments, the conditions may relate to whether the outputs produced by the artificial intelligence model 132 based on the training data 142 match the known labels associated with the training data 142 or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for the model, such as based on validation data and test data, as is known in the art.

In some embodiments, the artificial intelligence model 132 has been pre-trained, such as based on a large set of the training data 142. The artificial intelligence model 132 may also be re-trained on an ongoing basis, such as based on user feedback with respect to outputs produced by the artificial intelligence model 132, thus providing a feedback loop by which the artificial intelligence model 132 is iteratively improved.

Although FIG. 1 depicts the artificial intelligence device 130 and database 140 storing the training data 142 and natural language prompt(s) 144 as being separate from the server 110, it should be understood that the scope of the present disclosure is intended to cover embodiments in which functionality of at least one of the artificial intelligence device 130 or the database 140 is implemented by the server 110. For instance, in some embodiments, the training data 142 and the natural language prompt(s) 144 may be stored in the server 110. Alternatively, or additionally, the artificial intelligence model 132 can, in some embodiments, be implemented on the server 110.

Feedback Loop for Artificial Intelligence Model

Figure 2:
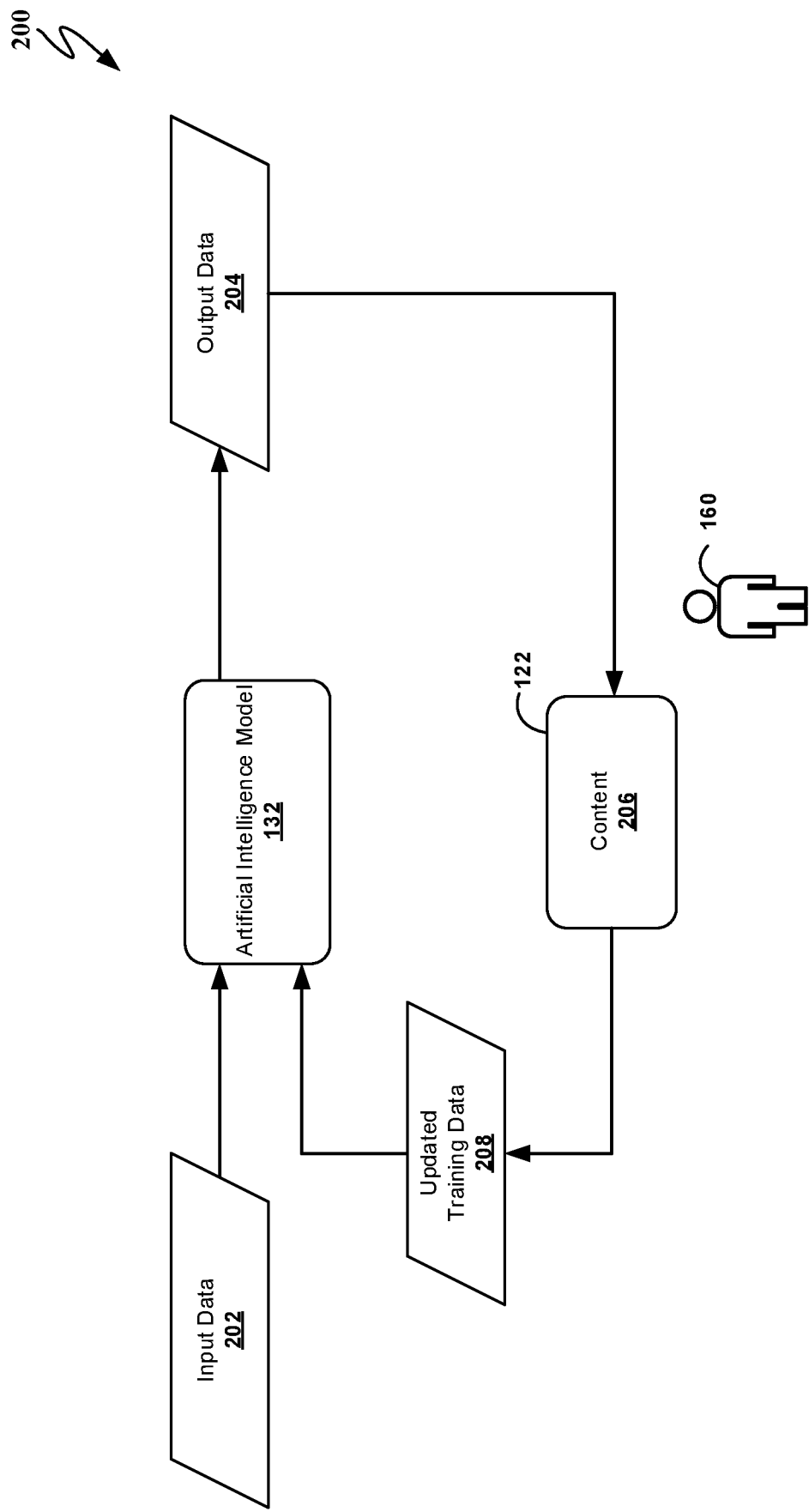
FIG. 2 depicts a feedback loop for re-training a trained artificial intelligence model for generating content for a document for an individual according to some embodiments of the present disclosure.

FIG. 2 illustrates a feedback loop 200 for the artificial intelligence model 132 according to some embodiments of the present disclosure. As shown, input data 202 may be provided to the artificial intelligence model 132. The input data 202 may include a plurality of input features (e.g., age, gender, marital status, income, etc.) specific to an individual for whom the artificial intelligence model 132 is being asked to generate content for inclusion in a document that is uniquely tailored for the individual. Additionally, the artificial intelligence model 132 may also be provided the natural language prompt(s) 144 discussed above with reference to FIG. 1. For instance, the natural language prompt(s) 144 may provide the artificial intelligence model 132 with context on what the artificial intelligence model 132 needs to do with the input data 202.

The artificial intelligence model 132 may generate output data 204 based, at least in part, on the input data 202. The output data 204 may include content 206 that the artificial intelligence model 132 determines is relevant to the individual based on the input data 202 and therefore should be included in the document that is being uniquely tailored for the individual. For instance, in some embodiments, the document may be a questionnaire that will be used by an accountant to collect details about the individual to understand the individual's tax situation and, as a result, determine a strategy for prepare a tax return for the individual. In such embodiments, the content may include a series of questions that the artificial intelligence model 132 determines are relevant to the individual based, at least in part, on the input data 202.

In some embodiments, the content 206 may be displayed for viewing by the user 160 via the user interface 122 of the client device 120 (discussed above with reference to FIG. 1).

In this manner, the user 160 may review the content 206 for accuracy. For instance, the user 160 may determine that a portion (e.g., one or more questions) of the content 206 generated by the artificial intelligence model 132 is, in fact, not relevant to the individual. In such embodiments, the user may provide feedback on the content 206 generated by the artificial intelligence model 132. For instance, the user may input one or more notes indicating that some or all of the content 206 is not relevant and should therefore be deleted. Alternatively, or additionally, the user 160 may input one or more notes describing additional content that was not generated by the artificial intelligence model 132 but that is relevant to the individual and should therefore be included in the document.

Updated training data 208 may be generated based, at least in part, on the user feedback on the content 206 generated by the artificial intelligence model 132. Furthermore, the updated training data 208 may be provided to the artificial intelligence model 132 and the artificial intelligence model 132 may be re-trained based on the updated training data 208. In this manner, the feedback loop 200 can allow for the artificial intelligence model 132 to be iteratively improved and, as a result, provide more improved (e.g., accurate) content for subsequent individuals.

Flow Diagram of Method for Automatically Generating Content for a Document

Figure 3:
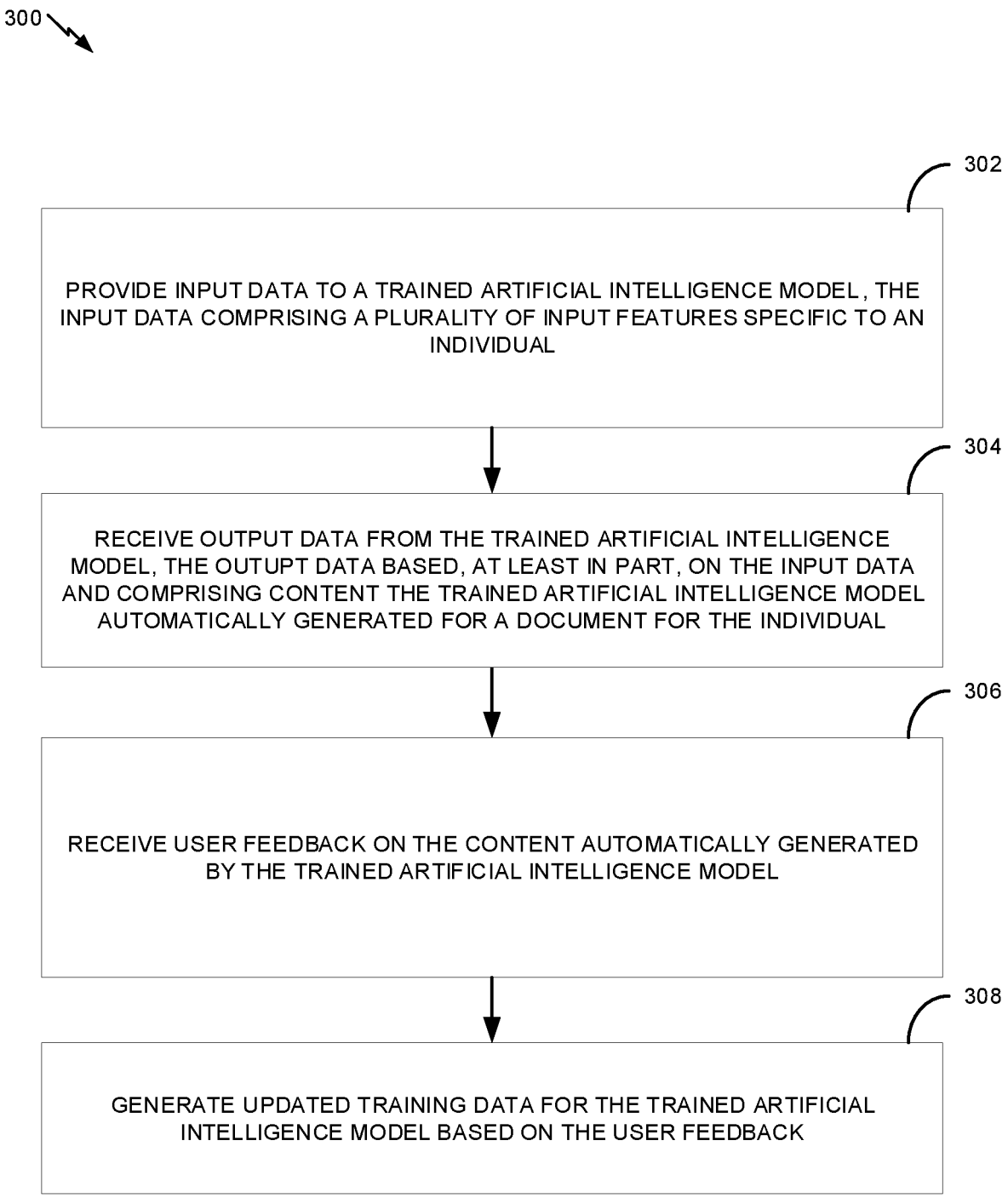
FIG. 3 depicts a flow diagram of a method for automatically generating content for a document for an individual according to some embodiments of the present disclosure.

FIG. 3 is a flow diagram of an example method 300 for automatically generating content for a document according to some embodiments of the present disclosure. The method 300 may be performed by instructions executing on a processor of a server (such as the server 110 of FIG. 1).

Operation 302 may include providing input data to a trained artificial intelligence model. The input data may include a plurality of input features specific to the individual. For instance, in some embodiments, the plurality of input features may be extracted from a source document (e.g., prior tax return) associated with the individual. Furthermore, in some embodiments, a profile may generated for the individual based, at least in part, on the source document. The profile may include the plurality of input features that are specific to the individual. In some embodiments, the input data provided to the trained artificial intelligence model may include the profile. In alternative embodiments, the input data may include a subset of the plurality of input features included in the profile generated for the user.

Operation 304 may include receiving output data from the trained artificial intelligence model. The output data may be based on the input data provided to the trained artificial intelligence model at 302. Furthermore, the output data may include the content for the document for the individual. For instance, in some embodiments, the document may be associated with a professional service (e.g., tax return preparation) a professional (e.g., accountant) will be providing the individual, and the content the trained artificial intelligence model automatically generates for the document may include a series of questions that the trained artificial intelligence model determined are relevant to the individual based, at least in part, on the input data (e.g., plurality of input features specific to the individual) provided at 302.

Operation 306 may include receiving user feedback on the content automatically generated by the trained artificial intelligence model at 304. For instance, in some embodiments, the user feedback may be provided by an authorized personnel, such as the professional that will be providing the professional service associated with the document for which the trained artificial intelligence model automatically generated content for that is specific to the individual. In some embodiments, the user feedback may indicate that a portion of the content automatically generated by the trained artificial intelligence model is, in fact, not relevant to the individual and needs to be removed. Alternatively, or additionally, the user feedback may indicate that additional content that was not included in the content automatically generated by the trained artificial intelligence model needs to be included in the document.

Operation 308 may include generating updated training data for the trained artificial intelligence model based on the user feedback received at 306. For instance, in some embodiments, the updated training data may be generated in real-time as the user feedback is being provided. In this manner, the trained artificial intelligence model may be re-trained in real-time. In alternative embodiments, the updated training data may be provided to the trained artificial intelligence model in batch at predetermined frequency (e.g., once a day, once a week, once a month, etc.).

In certain embodiments, the method 300 may include modifying the content automatically generated by the trained artificial intelligence model based on the user feedback received at 306. For instance, in some embodiments, modifying the content may include removing (e.g., deleting) a portion of the content automatically generated by the trained artificial intelligence model. Alternatively, or additionally, modifying the content may include adding additional content to the content automatically generated by the trained artificial intelligence model. In some embodiments, the document may be populated with the modified content and, in some embodiments, may be automatically provided to the individual. For instance, in some embodiments, an electronic copy of the document may be transmitted (e.g., via electronic mail) to the individual. In this manner, the individual can begin populating the document with the requested information needed to help the professional provide the professional service to the individual.

Example Computing Systems

Figure 4A:
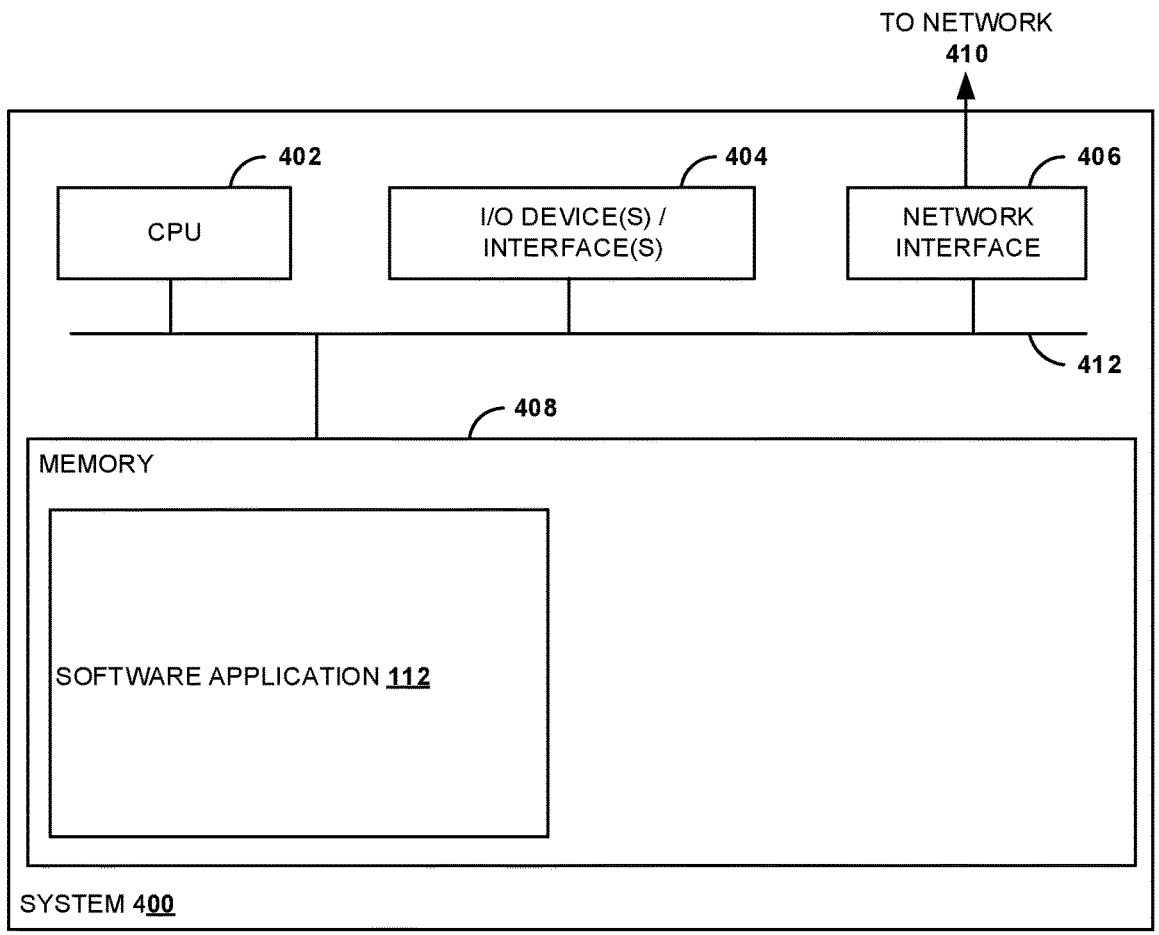
FIGS. 4A and 4B depict example computing systems according to some embodiments of the present disclosure.

FIG. 4A illustrates an example computing system 400 with which embodiments of the computing environment 100 of FIG. 1 may be implemented. For example, the computing system 400 may be representative of the server 110 of FIG. 1.

The computing system 400 includes a central processing unit (CPU) 402, one or more I/O device interfaces 404 that may allow for the connection of various I/O devices 404 (e.g., keyboards, displays, mouse devices, pen input, etc.) to the computing system 400, a network interface 406, a memory 408, and an interconnect 412. It is contemplated that one or more components of the computing system 400 may be located remotely and accessed via a network 410 (e.g., which may be the network(s) 150 of FIG. 1). It is further contemplated that one or more components of the computing system 400 may include physical components or virtualized components.

The CPU 402 may retrieve and execute programming instructions stored in the memory 408. Similarly, the CPU 402 may retrieve and store application data residing in the memory 408. The interconnect 412 transmits programming instructions and application data, among the CPU 402, the I/O device interface 404, the network interface 406, the memory 408. The CPU 402 is included to be representative of a single CPU, multiple CPUs, a single CPU having multiple processing cores, and other arrangements.

Additionally, the memory 408 is included to be representative of a random access memory or the like. In some embodiments, the memory 408 may include a disk drive, solid state drive, or a collection of storage devices distributed across multiple storage systems. Although shown as a single unit, the memory 408 may be a combination of fixed and/or removable storage devices, such as fixed disc drives, removable memory cards or optical storage, network attached storage (NAS), or a storage area-network (SAN).

As shown, the memory 408 may, in some embodiments, include the software application 112 discussed above with reference to FIG. 1.

Figure 4B:
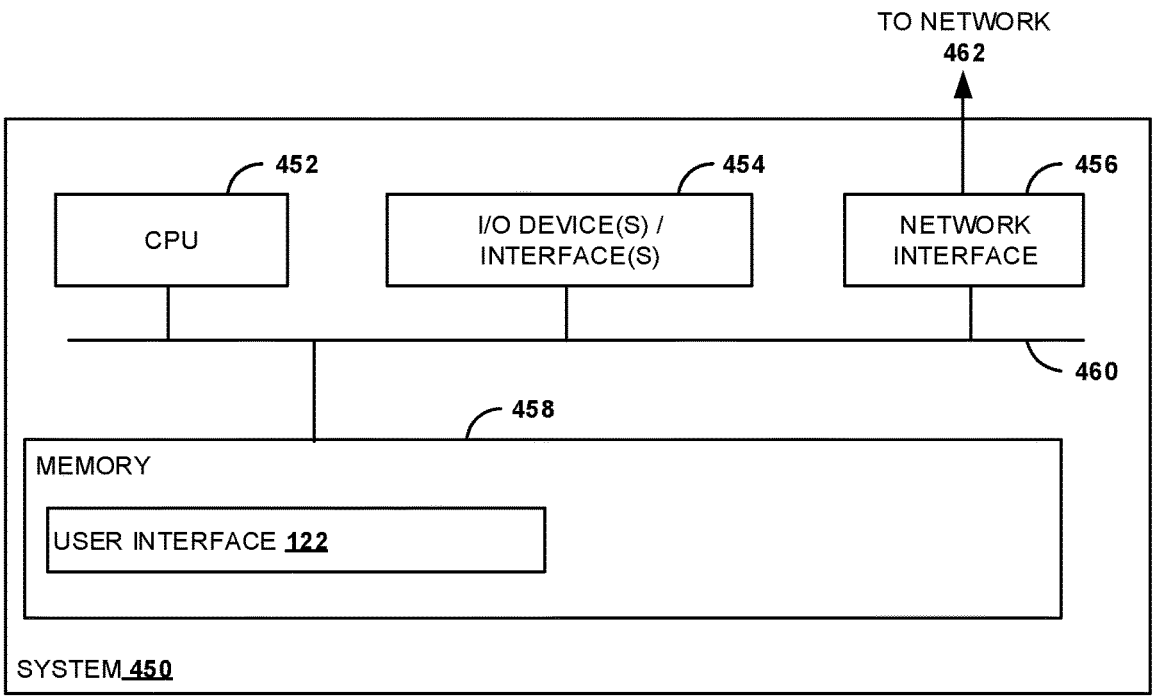

FIG. 4B illustrates an example computing system 450 with which embodiments of the computing environment 100 may be implemented. For example, the computing system 450 may be representative of the client device 120 of FIG. 1.

The computing system 450 includes a central processing unit (CPU) 452, one or more I/O device interfaces 454 that may allow for the connection of various I/O devices (e.g., keyboards, displays, mouse devices, pen input, etc.) to the computing system 450, a network interface 456, a memory 458, and an interconnect 460. It is contemplated that one or more components of the computing system 450 may be located remotely and accessed via a network 462 (e.g., which may be the network(s) 150 of FIG. 1). It is further contemplated that one or more components of the computing system 450 may include physical components or virtualized components.

The CPU 452 may retrieve and execute programming instructions stored in the memory 458. Similarly, the CPU 452 may retrieve and store application data residing in the memory 458. The interconnect 460 transmits programming instructions and application data, among the CPU 452, the I/O device interface 454, the network interface 456, the memory 458. The CPU 452 is included to be representative of a single CPU, multiple CPUs, a single CPU having multiple processing cores, and other arrangements.

Additionally, the memory 458 is included to be representative of a random access memory or the like. In some embodiments, the memory 458 may include a disk drive, solid state drive, or a collection of storage devices distributed across multiple storage systems. Although shown as a single unit, the memory 458 may be a combination of fixed and/or removable storage devices, such as fixed disc drives, removable memory cards or optical storage, network attached storage (NAS), or a storage area-network (SAN).

As shown, the memory 458 may, in some embodiments, include the user interface 122 discussed above with reference to FIG. 1.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that may execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor may read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed:

1. A method for automatically generating content for a document for an individual, the method comprising:
   receiving, by one or more processors, one or more source documents associated with the individual;
   generating, by the one or more processors, a profile for the individual based, at least in part, on the one or more source documents, the profile including a plurality of input features specific to the individual;
   providing, by the one or more processors, the profile as input data to a trained artificial intelligence model, wherein the trained artificial intelligence model is trained through a supervised learning process using training data comprising a plurality of features for each of a plurality of individuals other than the individual for whom the document is being created;
   receiving, by the one or more processors, output data from the trained artificial intelligence model, the output data based, at least in part, on the input data and comprising the content the trained artificial intelligence model automatically generated for the document for the individual, wherein the content comprises a series of questions;
   receiving, by the one or more processors, user feedback on the content generated for the individual by the trained artificial intelligence model; and
   generating, by the one or more processors, updated training data for the trained artificial intelligence model based on the user feedback, wherein the trained artificial intelligence model is re-trained based on the updated training data.

2. The method of claim 1, wherein the document is associated with a professional service.

3. The method of claim 2, wherein receiving user feedback on the content comprises:
receiving, by the one or more processors, user feedback indicating that one or more questions included in the series of questions is not relevant to the individual; or
receiving, by the one or more processors, user feedback indicating that an additional question needs to be added to the series of questions.

4. The method of claim 1, further comprising:
modifying, by the one or more processors, the content based, at least in part, on the user feedback.

5. The method of claim 1, wherein the trained artificial intelligence model is re-trained in real-time as the user feedback is received.

6. The method of claim 1, wherein the trained artificial intelligence model comprises a large language model.

7. The method of claim 1, further comprising:
providing, by the one or more processors, a natural language prompt as an input to the trained artificial intelligence model, the natural language prompt providing context to the input data being provided to the trained artificial intelligence model.

8. A system for automatically generating content for a document for an individual, the system comprising:
one or more processors; and
one or more memory configured to store computer executable instructions that, when executed by the one or more processors, cause the one or more processors to:
receive a source document associated with the individual;
generate a profile for the individual based, at least in part, on the source document, the profile including a plurality of input features specific to the individual; and
provide the profile as input data to a trained artificial intelligence model, wherein the trained artificial intelligence model is trained through a supervised learning process using training data comprising a plurality of features for each of a plurality of individuals other than the individual for whom the document is being created;
receive output data from the trained artificial intelligence model, the output data based, at least in part, on the input data and comprising the content the trained artificial intelligence model automatically generated for the document for the individual, wherein the content comprises a series of questions;
receive user feedback on the content generated by the trained artificial intelligence model; and
generate updated training data for the trained artificial intelligence model based on the user feedback, wherein the trained artificial intelligence model is re-trained based on the updated training data.

9. The system of claim 8, the document is associated with a professional service.

10. The system of claim 9, wherein to receive user feedback on the content, the one or more processors are configured to:
receive user feedback indicating that one or more questions included in the series of questions is not relevant to the individual; or
receive user feedback indicating that an additional question needs to be added to the series of questions.

11. The system of claim 8, wherein the one or more processors are further configured to:
modify the content based, at least in part, on the user feedback.

12. The system of claim 8, wherein the trained artificial intelligence model is re-trained in real-time as the user feedback is received.

13. The system of claim 8, wherein the trained artificial intelligence model comprises a large language model.

14. The system of claim 8, wherein the one or more processors are further configured to:
provide a natural language prompt as an input to the trained artificial intelligence model, the natural language prompt providing context to the input data being provided to the trained artificial intelligence model.

15. A non-transitory computer readable medium comprising instructions to be executed in a computer system, wherein the instructions when executed in the computer system perform a method for automatically generating content for a document for an individual, the method comprising:
receiving a source document associated with the individual;
generating a profile for the individual based, at least in part, on the source document, the profile including a plurality of input features specific to the individual;
providing the profile as input data to a trained artificial intelligence model, wherein the trained artificial intelligence model is trained through a supervised learning process using training data comprising a plurality of features for each of a plurality of individuals other than the individual for whom the document is being created;
receiving output data from the trained artificial intelligence model, the output data based, at least in part, on the input data and comprising the content the trained artificial intelligence model automatically generated for the document for the individual;
receiving user feedback on the content generated by the trained artificial intelligence model; and
generating updated training data for the trained artificial intelligence model based on the user feedback, wherein the trained artificial intelligence model is re-trained based on the updated training data.

16. The non-transitory computer readable medium of claim 15, wherein the method further comprises:
modifying the content based, at least in part, on the user feedback.

17. The non-transitory computer readable medium of claim 15, wherein the trained artificial intelligence model is re-trained in real-time as the user feedback is received.

* * * * *